(12) United States Patent
Doi et al.

(10) Patent No.: US 12,031,476 B2
(45) Date of Patent: Jul. 9, 2024

(54) COVER FOR INTERNAL COMBUSTION ENGINE

(71) Applicant: TOYOTA BOSHOKU KABUSHIKI KAISHA, Aichi-ken (JP)

(72) Inventors: Kensuke Doi, Obu (JP); Yoji Horiuchi, Kariya (JP); Hideto Morishita, Gifu (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/522,278

(22) Filed: Nov. 9, 2021

(65) Prior Publication Data
US 2022/0154637 A1    May 19, 2022

(30) Foreign Application Priority Data
Nov. 17, 2020  (JP) .................. 2020-190793

(51) Int. Cl.
*F02B 77/00*  (2006.01)
(52) U.S. Cl.
CPC .................. *F02B 77/00* (2013.01)
(58) Field of Classification Search
CPC ...................................... F02B 77/00
USPC ...................................... 123/198 E
See application file for complete search history.

(56) References Cited

U.S. PATENT DOCUMENTS

| 9,605,745 B1* | 3/2017 | Burns ............... F16B 35/00 |
| 2015/0096526 A1* | 4/2015 | Kurita ............... F02F 7/008 |
| | | 123/195 C |
| 2016/0258328 A1* | 9/2016 | Tsukahara ............... F01L 1/022 |
| 2018/0142788 A1* | 5/2018 | Kawano ............... F16J 15/3252 |
| 2018/0266358 A1 | 9/2018 | Mohapatra et al. |

FOREIGN PATENT DOCUMENTS

| JP | 2014-181593 | 9/2014 |
| JP | 2015-71996 | 4/2015 |

OTHER PUBLICATIONS

Office Action issued in Corresponding JP Patent Application No. 2020-190793, dated Oct. 31, 2023, along with an English translation thereof.

* cited by examiner

*Primary Examiner* — Lindsay M Low
*Assistant Examiner* — Omar Morales
(74) *Attorney, Agent, or Firm* — Greenblum & Bernstein, P.L.C.

(57) ABSTRACT

A cover for an internal combustion engine is configured to be attached to an engine main body so as to cover a timing chain or a timing belt. The cover for the internal combustion engine includes insertion holes configured to receive a crankshaft or a camshaft. The cover for the internal combustion engine includes a first member made of a hard plastic and a second member made of a material different from the hard plastic. The first member is produced by insert molding with the second member embedded in the first member. A periphery of at least one of the insertion holes in the second member includes a joint surface that is joined to the first member. The joint surface includes annular grooves surrounding the insertion hole, the annular grooves being arranged in a radial direction of the insertion hole.

9 Claims, 7 Drawing Sheets

COVER FOR INTERNAL COMBUSTION ENGINE

BACKGROUND

1. Field

The present disclosure relates to a cover for an internal combustion engine that is configured to cover a timing chain or a timing belt that transmits the rotation of a crankshaft of the internal combustion engine to camshafts.

2. Description of Related Art

One example of such covers is a chain cover disclosed in Japanese Laid-Open Patent Publication No. 2015-71996. This chain cover is attached to an engine main body and includes a boss in a lower portion. The boss of the chain cover includes a through-hole, into which the front end of the crankshaft is passed through. The lower portion of the chain cover is covered with a plate-shaped retainer. The retainer is attached to the engine main body. The retainer includes a boss. The boss of the retainer includes a through-hole, into which the front end of the crankshaft is passed through.

The above-described chain cover includes an annular seal member made of an elastic material. The seal member is arranged between the periphery of the through-hole of the chain cover and the periphery of the through-hole of the retainer, thereby preventing oil in the crankcase from infiltrating into the space between the chain cover and the retainer along the circumference of the crankshaft. That is, the above-described chain cover requires the seal member to ensure the sealing property between the chain cover and the retainer. This inevitably increases the number of components.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cover for an internal combustion engine is provided. The cover is configured to be attached to an engine main body so as to cover a timing chain or a timing belt that transmits a rotational force of a crankshaft to a camshaft. The cover includes insertion holes configured to receive the crankshaft or the camshaft. The cover also includes a first member made of a hard plastic and a second member made of a material different from the hard plastic. The first member is produced by insert molding with the second member embedded in the first member. A periphery of at least one of the insertion holes in the second member includes a joint surface that is joined to the first member. The joint surface includes annular grooves surrounding the insertion hole, the annular grooves being arranged in a radial direction of the insertion hole.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A cover for an internal combustion engine according to one embodiment will now be described with reference to the drawings. The cover is a timing chain cover attached to a reciprocating (piston-type) internal combustion engine mounted on a vehicle.

Figure 1:
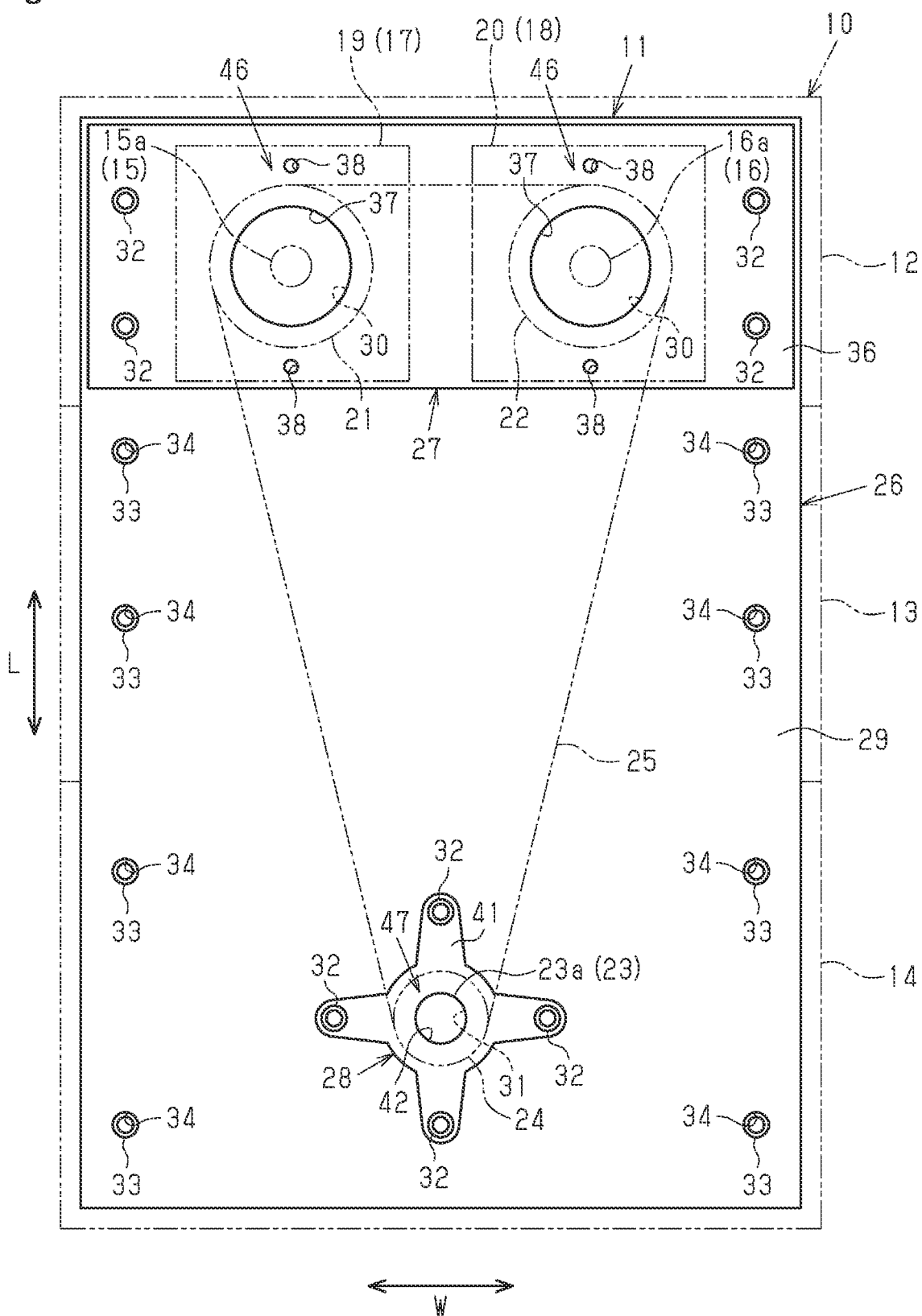
FIG. 1 is a schematic front view showing a timing chain cover according to one embodiment attached to an engine main body of an internal combustion engine.

As shown in FIG. 1, the internal combustion engine includes an engine main body 10 and a timing chain cover 11, which is an example of a cover attached to the engine main body 10. The engine main body 10 includes a cylinder head 12, a cylinder block 13, and a crankcase 14. The cylinder block 13 is disposed between the cylinder head 12 and the crankcase 14.

The cylinder head 12 rotatably supports an intake camshaft 15 and an exhaust camshaft 16. The intake camshaft 15 and the exhaust camshaft 16 respectively open and close intake valves (not shown) and exhaust valves (not shown), which are engine valves. The camshafts 15, 16 includes ends 15a, 16a on one side, which protrude from the cylinder head 12.

Motor-driven variable valve timing mechanisms 17, 18 are respectively coupled to the ends 15a, 16a of the camshafts 15, 16. The variable valve timing mechanisms 17, 18 respectively include motors 19, 20 and actuators (not shown), which include speed reduction mechanisms (not shown) and link mechanisms (not shown). The actuators of the variable valve timing mechanisms 17, 18 respectively include driven sprockets 21, 22.

The crankcase 14 rotatably supports a crankshaft 23. The crankshaft 23 includes an end 23a that protrudes from the crankcase 14. The end 23a of the crankshaft 23 protrudes in the same direction as the ends 15a, 16a of the camshafts 15, 16. A drive sprocket 24 is coupled to the end 23a of the crankshaft 23.

A timing chain 25 is looped over the driven sprockets 21, 22 and the drive sprocket 24. Accordingly, when the drive sprocket 24 is rotated, rotational force of the drive sprocket 24 is transmitted to the two driven sprockets 21, 22 by the timing chain 25, so that the two driven sprockets 21, 22 rotate in conjunction with the drive sprocket 24. That is, the timing chain 25 transmits the rotational force of the crankshaft 23 to the camshafts 15, 16.

The intake-side variable valve timing mechanism 17 controls the rotation speed of the motor 19 so as to vary the rotational phase of the intake camshaft 15 relative to the driven sprocket 21. The exhaust-side variable valve timing mechanism 18 controls the rotation speed of the motor 20 so as to vary the rotational phase of the exhaust camshaft 16 relative to the driven sprocket 22. Controllers (not shown) are respectively integrated with the motors 19, 20 to control the motors 19, 20.

The timing chain cover 11 is attached to the engine main body 10 so as to cover the timing chain 25. The timing chain cover 11 has a rectangular shape in front view. The timing chain cover 11 includes a first member 26 and second members, which include, as examples, an upper second member 27 and a lower second member 28. The first member 26 is made of a hard plastic. The upper second member 27 is made of a material different from the hard plastic. Also, the lower second member 28 is also made of a material different from the hard plastic. In the following description, the direction along the long sides of the timing chain cover 11 (the vertical direction as viewed in FIG. 1) will be referred to as a longitudinal direction L, and the direction along the short sides (the lateral direction as viewed in FIG. 1) will be referred to as a width direction W.

Figure 2:
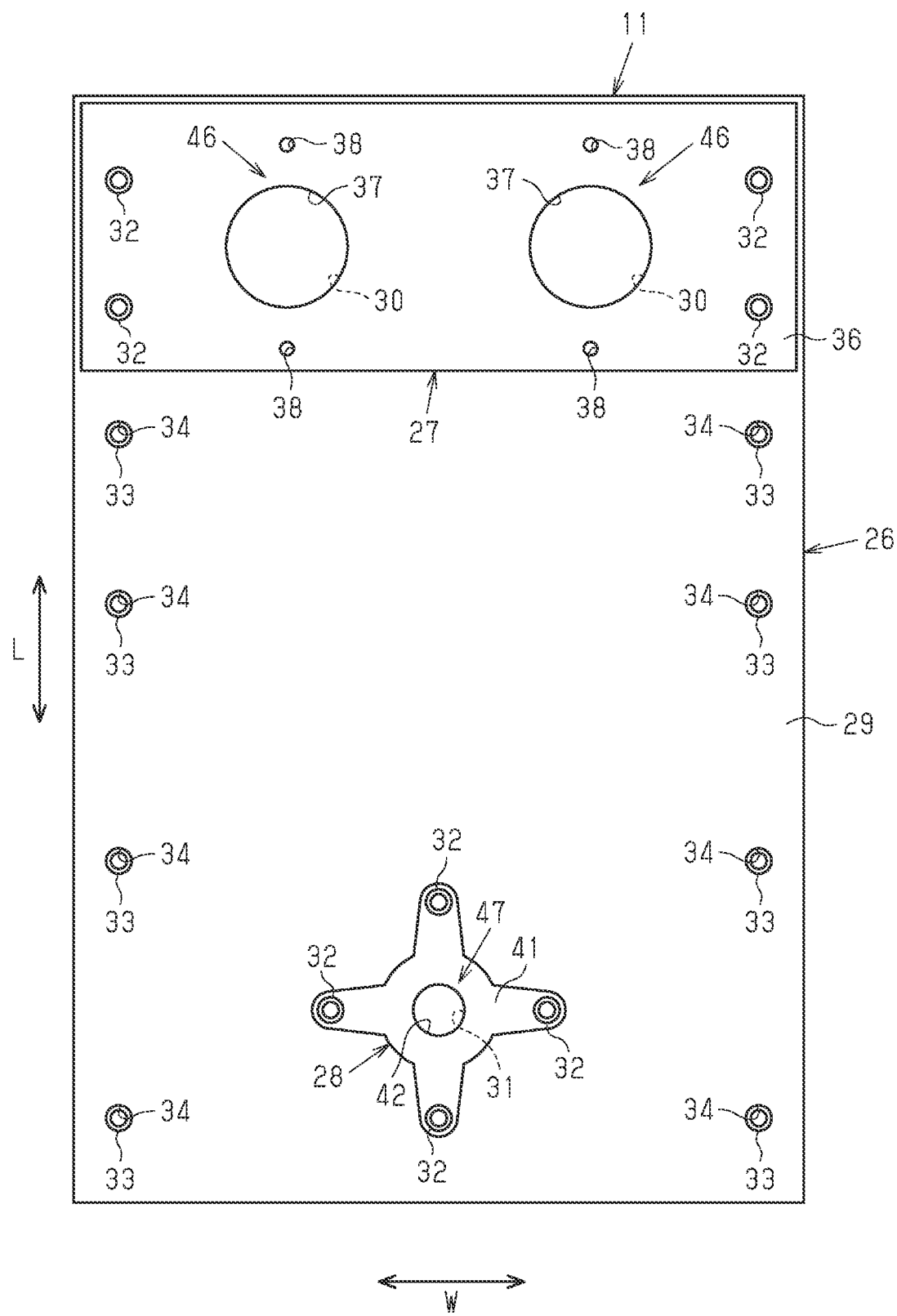
FIG. 2 is a schematic front view of the timing chain cover.

As shown in FIGS. 1 and 2, the timing chain cover 11 includes the first member 26, the upper second member 27, and the lower second member 28. The first member 26 has a rectangular shape in front view and provides the outline of the timing chain cover 11. The upper second member 27 is joined to an end portion (the upper end portion as viewed in FIG. 1) of a front face 29 of the first member 26 in the longitudinal direction L. The lower second member 28 is joined to another end portion (the lower end portion as viewed in FIG. 1) of the front face 29 of the first member 26 in the longitudinal direction L. The upper second member 27 has a rectangular shape that is elongated in the width direction W in front view. The lower second member 28 substantially has the shape of a cross.

The first member 26 has two first insertion holes 30, which are examples of insertion holes into which the camshafts 15, 16 are passed through. The insertion holes 30 are located in a portion covered with the upper second member 27 and are spaced apart from each other in the width direction W. Also, the first member 26 has a second insertion hole 31, which is an example of an insertion hole into which the crankshaft 23 is passed through. The insertion hole 31 is located in a portion covered with the lower second member 28.

The timing chain cover 11 includes tubular metal collars 32 in a portion of the first member 26 covered with the upper second member 27. Two of the collars 32 are located in each of opposite end portions in the width direction W to receive bolts (not shown) for attaching the timing chain cover 11 to the engine main body 10.

The timing chain cover 11 includes tubular metal collars 32, the number of which is four in this example, in a portion of the first member 26 covered with the lower second member 28. The collars 32 are located around the second insertion hole 31. The collars 32 receive bolts (not shown) for attaching the timing chain cover 11 to the engine main body 10. These four collars 32 are arranged at equal intervals in the circumferential direction of the second insertion hole 31.

The first member 26 has fastening holes 34 at portions that are not covered with the upper second member 27 or the lower second member 28. The fastening holes 34 receive tubular metal collars 33. As an example, the timing chain cover 11 of the present embodiment includes four fastening holes 34 on each side portion in the width direction W that are spaced apart from each other in the longitudinal direction L.

In FIG. 1, the bolts inserted into the collars 32, 33 are omitted. In the present embodiment, the first member 26 is made of a plastic that has polyamide (PA-6GF) as a major component.

Figure 3:
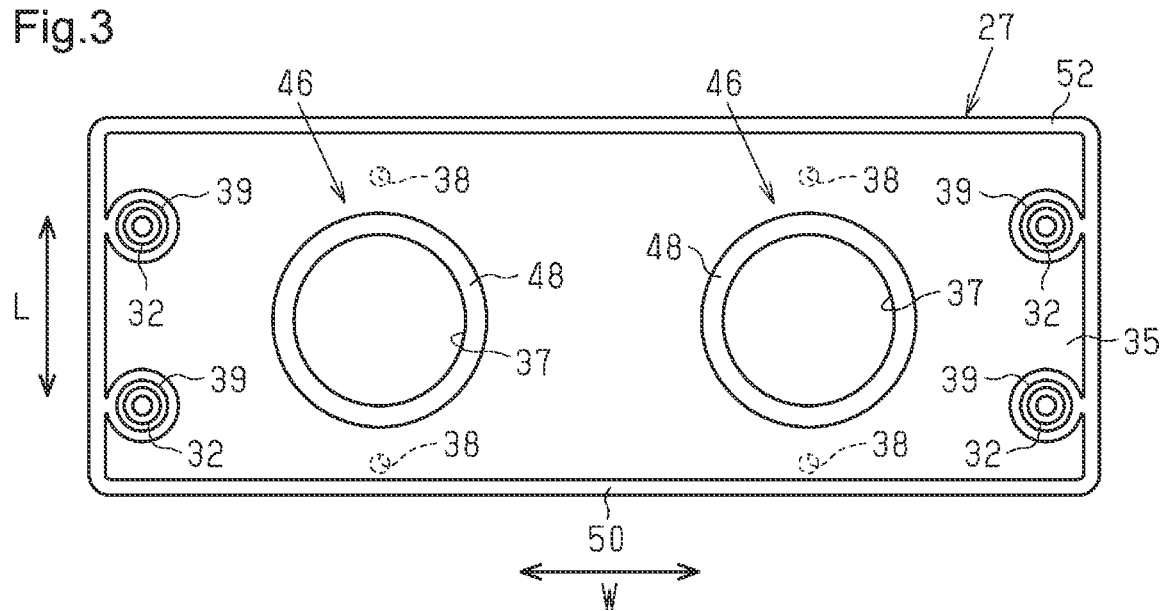
FIG. 3 is a schematic rear view showing an upper second member of the timing chain cover.
Figure 4:
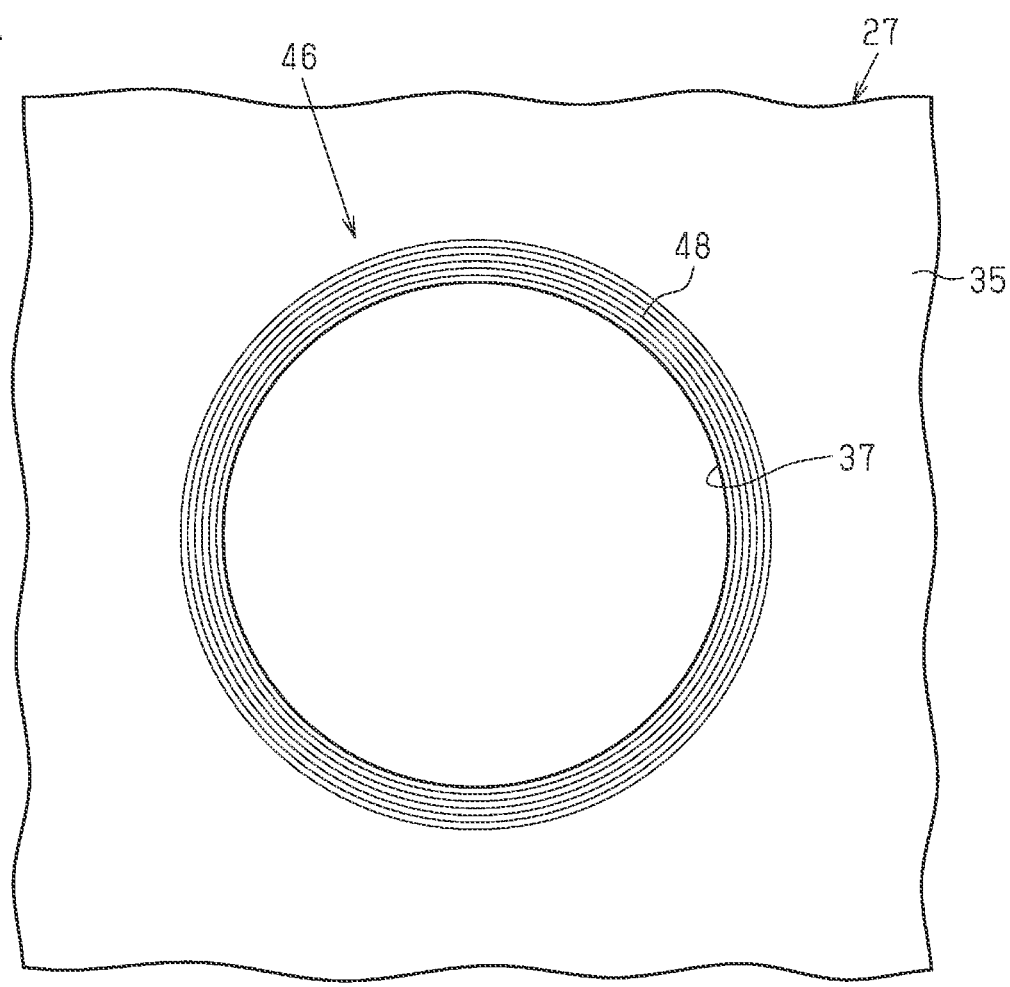
FIG. 4 is an enlarged view showing a back side of the upper second member shown in FIG. 3.
Figure 5:
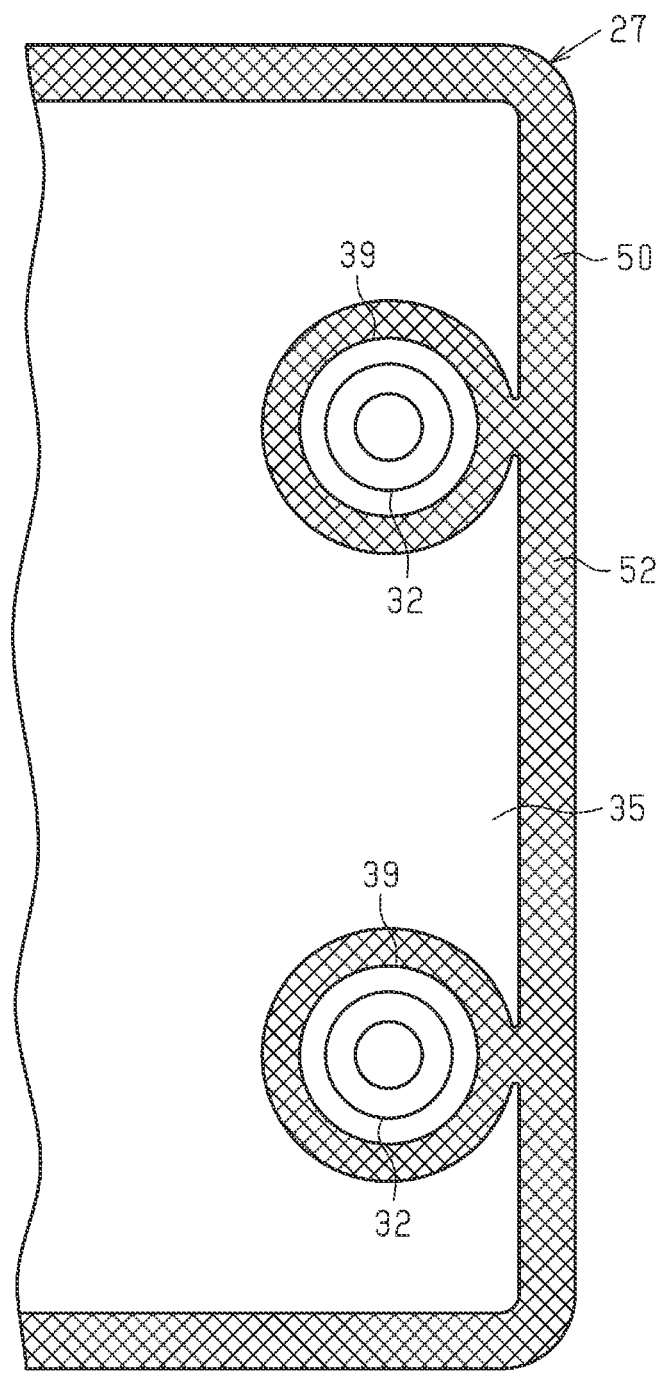
FIG. 5 is an enlarged view of the upper second member shown in FIG. 3.

As shown in FIGS. 1 to 3, the upper second member 27 includes a back face 35, which is joined to the front face 29 of the first member 26, and a front face 36 located on a side opposite to the back face 35. The upper second member 27 has two first insertion holes 37, which respectively receive the camshafts 15, 16, at positions spaced apart from each other in the width direction W. The two first insertion holes 37 are respectively continuous with the two first insertion holes 30 of the first member 26.

The motors 19, 20, with which the controllers (not shown) are integrated, are attached to the front face 36 of the upper second member 27. The upper second member 27 has mounting holes 38 in the front face 36 at positions about the first insertion holes 37. Bolts (not shown) for attaching the motors 19, 20 to the upper second member 27 are threaded into the mounting holes 38.

As shown in FIG. 3, the upper second member 27 has tubular portions 39, the number of which is four in this example, on the back face 35. The tubular portions 39 surround the collars 32, the number of which is four in this example. That is, in the upper second member 27 in the present embodiment, two of the tubular portions 39 are arranged on either side portion in the width direction W, while being spaced apart from each other in the longitudinal direction L. The upper second member 27 is made of a hard plastic that has a lower coefficient of linear expansion and a lower water absorbency than the hard plastic forming the first member 26.

In the present embodiment, the upper second member 27 is made of polyphenylene sulfide (PPS-GF) as an example. The upper second member 27 is produced by insert molding with the collars 32 embedded in the upper second member 27. The first member 26 is produced by insert molding with the upper second member 27, the lower second member 28, and the collars 32 embedded in the first member 26.

Figure 6:
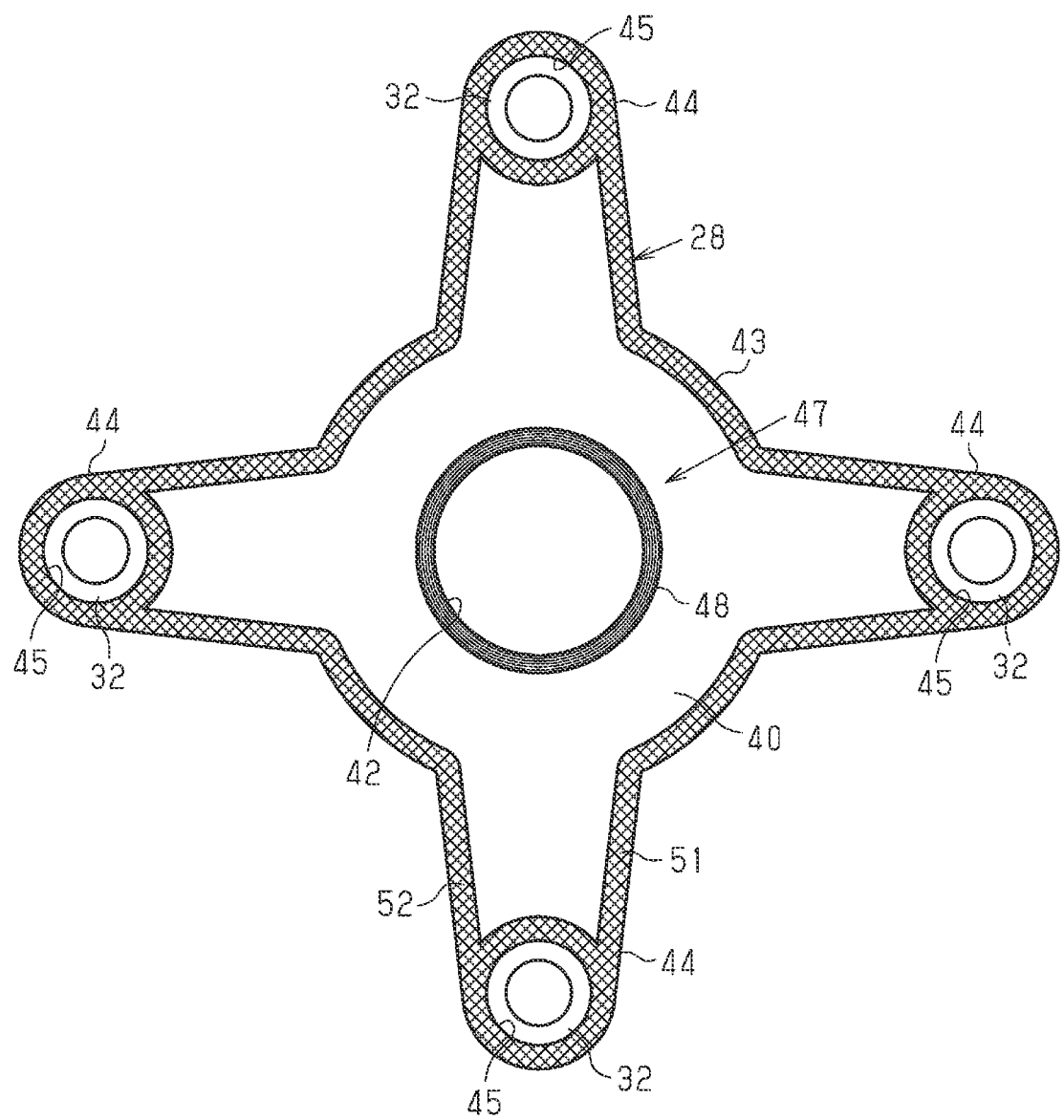
FIG. 6 is an enlarged schematic rear view showing a lower second member of the timing chain cover.

As shown in FIGS. 1, 2, and 6, the lower second member 28 includes a back face 40, which is joined to the front face 29 of the first member 26, and a front face 41 located on a side opposite to the back face 40. The lower second member 28 of the present embodiment is formed by, for example, aluminum die casting. The lower second member 28 includes an annular main body 43 and extending portions 44, the number of which is four in this example. The annular main body 43 includes a second insertion hole 42, which receives the crankshaft 23. The extending portions 44 extend outward in the radial direction of the main body 43 from the outer circumferential surface of the main body 43.

The second insertion hole 42 is continuous with the second insertion hole 31 of the first member 26. The four extending portions 44 are arranged at equal intervals in the circumferential direction of the main body 43. Each of the four extending portions 44 has a through-hole 45 in a distal portion, into which a collar 32 is inserted.

As shown in FIGS. 4 to 6, and 8, the upper second member 27 has annular first joint surfaces 48 on the back face 35 over entire peripheries 46 of the respective first insertion holes 37. Each first joint surface 48 is a joint surface joined to the first member 26. Likewise, the lower second member 28 has an annular first joint surface 48 on the back face 40 over an entire periphery 47 of the second insertion hole 42. The first joint surface 48 is a joint surface joined to the first member 26.

Each first joint surface 48 of the upper second member 27 has annular grooves 49, which have a common center and surround the first insertion hole 37. The annular grooves 49 are arranged in the radial direction of the first insertion hole 37. In this case, the center of the grooves 49 and the center of the first insertion hole 37 agree with each other. The lower second member 28 has annular grooves 49 in the first joint surface 48. The annular grooves 49 have a common center and surround the second insertion hole 42. The annular grooves 49 are arranged in the radial direction of the second insertion hole 42. In this case, the center of the grooves 49 and the center of the second insertion hole 42 agree with each other. The grooves 49 are formed, for example, by a laser device.

Figure 7:
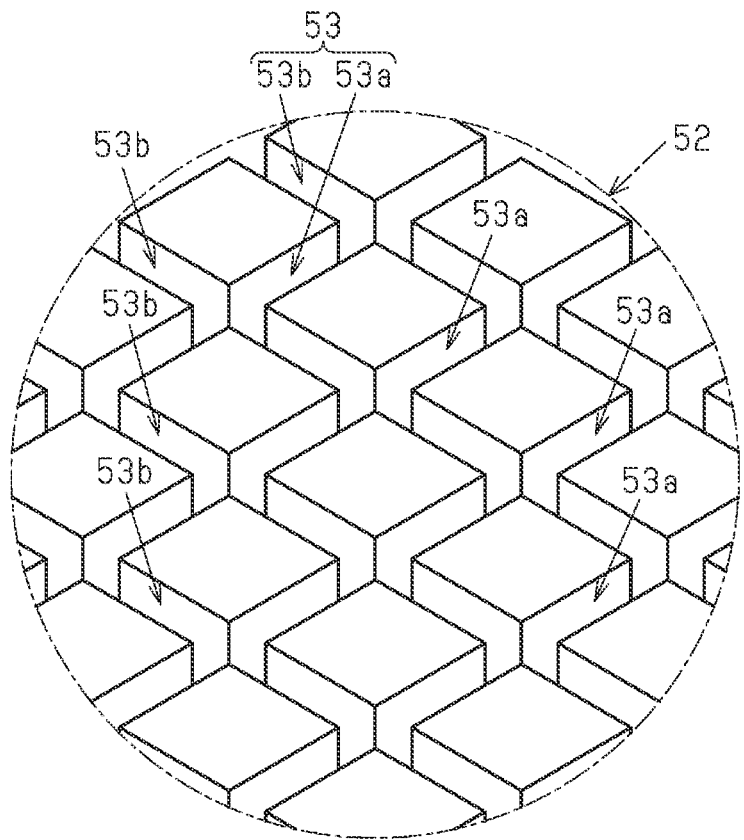
FIG. 7 is an enlarged diagram showing part of a periphery of the upper second member and part of a periphery of the lower second member.
Figure 8:
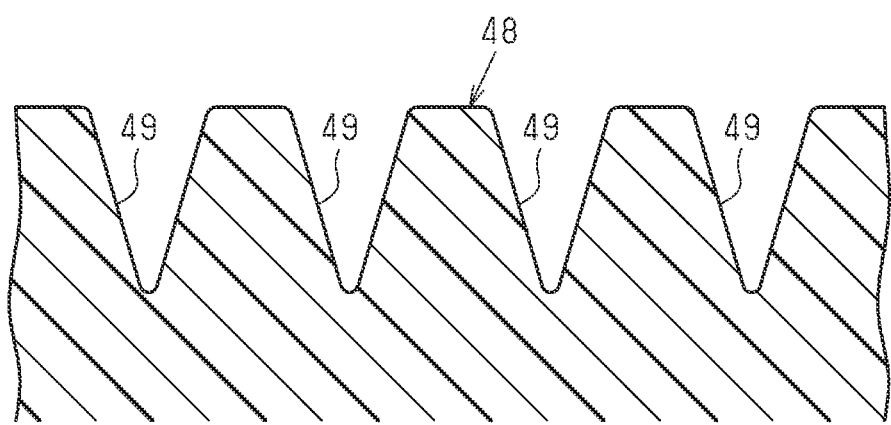
FIG. 8 is an enlarged schematic cross-sectional view showing part of the periphery of a first insertion hole in the upper second member and part of the periphery of a second insertion hole in the lower second member.

As shown in FIGS. 4 to 7, the upper second member 27 has a second joint surface 52 on the back face 35 over an entire periphery 50 including areas respectively surrounding the tubular portions 39. The second joint surface 52 is a joint surface joined to the first member 26. Likewise, the lower second member 28 has a second joint surface 52 on the back face 40 over an entire periphery 51 including areas respectively surrounding the through-holes 45. The second joint surface 52 is a joint surface joined to the first member 26. Lattice-shaped recess portions 53 are formed on the entire second joint surfaces 52. The recess portions 53 are formed, for example, by a laser device. As shown in FIG. 7, each recess portion 53 includes first grooves 53a, which extend in parallel, and second grooves 53b, which are orthogonal to the first grooves 53a.

Operation of the timing chain cover 11 will now be described.

Figure 9:
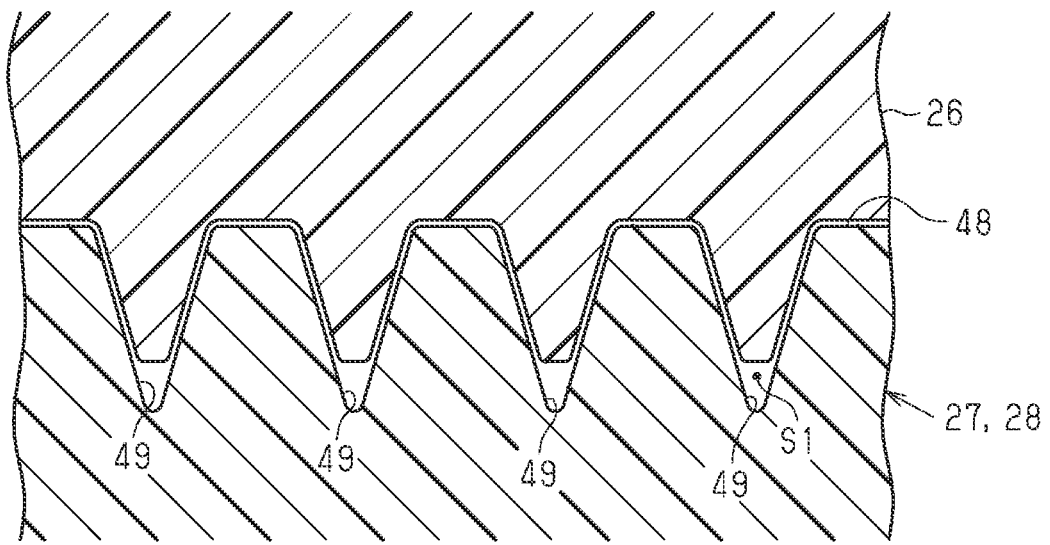
FIG. 9 is an enlarged schematic cross-section view showing a joined state of a first joint surface of the upper second member and a first member, and a joined state of a first joint surface of the lower second member and the first member.
Figure 10:
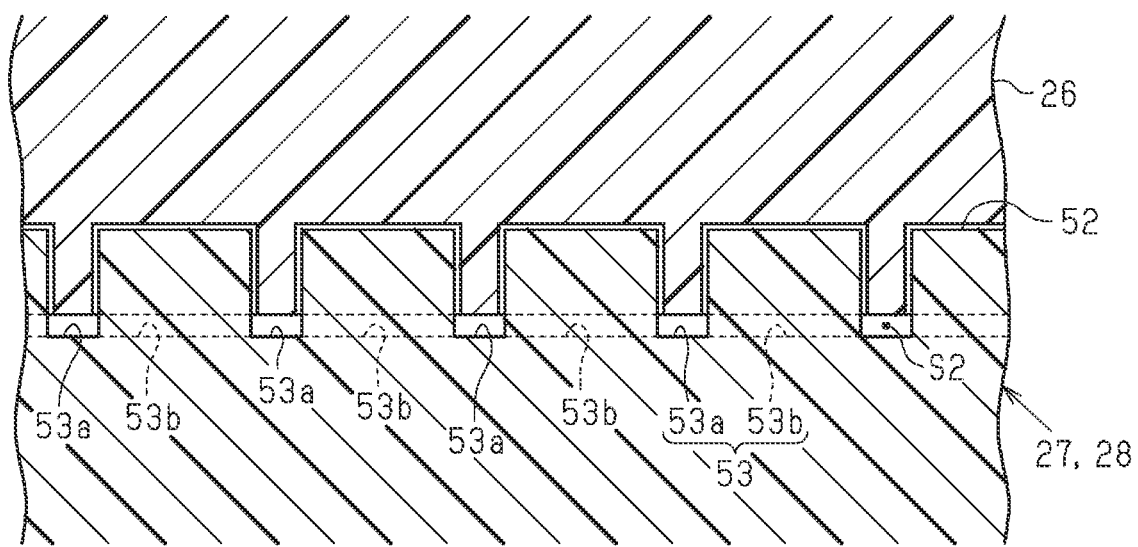
FIG. 10 is an enlarged schematic cross-section view showing a joined state of a second joint surface of the upper second member and the first member, and a joined state of a second joint surface of the lower second member and the first member.

When the first member 26 is produced by insert molding with the upper second member 27 and the lower second member 28 embedded in the first member 26 as shown in FIGS. 9 and 10, the grooves 49 formed in the first joint surfaces 48 of the upper second member 27 and the lower second member 28 and the recess portions 53 formed in the second joint surfaces 52 of the upper second member 27 and the lower second member 28 are filled with molten plastic. At this time, a small first gap S1 is created between the first member 26 and each first joint surface 48. Also, a small second gap S2 is created between the first member 26 and each second joint surface 52. For illustrative purposes, the gaps S1, S2 are partly exaggerated or partially omitted in FIGS. 9 and 10.

Since the recess portion 53 formed in each second joint surface 52 has the shape of a lattice, a large contact area is ensured between the second joint surface 52 and the first member 26 during the above-described molding process. This increases the joint strength of the first member 26 with each of the upper second member 27 and the lower second member 28. On the other hand, the first joint surfaces 48 have the annular grooves 49, which surround the first insertion holes 37 and the second insertion hole 42 and are arranged in the radial directions of the first insertion holes 37 and the second insertion hole 42.

This prevents blow-by gas and oil in the internal combustion engine from infiltrating from the small gaps S1 between the first joint surfaces 48 and the first member 26 through the first insertion holes 30, 37 and the second insertion holes 31, 42. That is, the first gaps S1 have a zigzag structure along the tops and bottoms of the grooves 49 of the first joint surfaces 48. In other words, the first gaps S1 have labyrinth structures. Thus, blow-by gas and oil cannot easily move through the first gaps S1.

Also, as shown in FIG. 10, the second gaps S2 have a structure in which the first grooves 53a and the second grooves 53b are connected to each other at intersections in the bottom of the lattice-shaped recess portion 53 (the lower portion of FIG. 10). Thus, if a lattice-shaped recess portion 53 were formed in the first joint surface 48 in place of grooves 49, blow-by gas in the internal combustion engine and oil splashed from the engine main body 10 would easily infiltrate from the gaps between the first joint surfaces 48 and the first member 26 through the intersections of the second gaps S2.

As described above, the timing chain cover 11 has an improved sealing property since the first joint surfaces 48, which have the annular grooves 49, are provided in the peripheries 46, 47 of the first insertion holes 30, 37 and the second insertion holes 31, 42, into which blow-by gas in the internal combustion engine and oil splashed from the engine main body 10 are likely to infiltrate. On the other hand, the timing chain cover 11 has an improved joint strength since the second joint surfaces 52, which have the lattice-shaped recess portions 53, are provided in the peripheries 50, 51 of the upper second member 27 and the lower second member 28, into which blow-by gas in the internal combustion engine and oil splashed from the engine main body 10 do not easily infiltrate and of which the joint strength tends to be insufficient.

That is, since the structure of the timing chain cover 11 has necessary functions provided at sections that require those functions without any additional components, multiple functions are achieved in an efficient manner.

The above-described embodiment achieves the following advantages.

(1) The timing chain cover 11 is configured to be attached to the engine main body 10 so as to cover the timing chain 25, which transmits the rotational force of the crankshaft 23 to the camshafts 15, 16. The timing chain cover 11 includes the first insertion holes 30, 37 and the second insertion holes 31, 42, which are configured to receive the crankshaft 23 or the camshafts 15, 16. The timing chain cover 11 includes the first member 26, which is made of a hard plastic, and the upper second member 27 and the lower second member 28, which are made of a material different from the hard plastic. The first member 26 is produced by insert molding with the upper second member 27 and the lower second member 28 embedded in the first member 26. The peripheries 46, 47 of the first insertion holes 30, 37 and the second insertion holes 31, 42 in the upper second member 27 and the lower second member 28 have the first joint surfaces 48 joined to the first member 26. The first joint surfaces 48 have the annular grooves 49, which surround the first insertion holes 30, 37 and the second insertion holes 31, 42 and are arranged in the radial directions of the first insertion holes 30, 37 and the second insertion holes 31, 42.

Generally, blow-by gas in an internal combustion engine and oil splashed from an engine main body are likely to infiltrate into a cover that covers a timing chain or a timing belt through small gaps between a first member and a joint surface of a second member. In this regard, the first joint surfaces 48 of the upper second member 27 and the lower second member 28 in the configuration of the above-described embodiment each have the annular grooves 49, which surround the first insertion holes 30, 37 and the second insertion holes 31, 42 and are arranged in the radial directions of the first insertion holes 30, 37 and the second insertion holes 31, 42. This prevents the blow-by gas and the oil in the internal combustion engine from infiltrating from the small gaps S1 between the first member 26 and the first joint surfaces 48 of the upper second member 27 and the lower second member 28. This improves the sealing property between the first member 26 and the upper second member 27 and between the first member 26 and the lower second member 28, without requiring any seal member. That is, the sealing property between the first member 26 and the upper second member 27 and between the first member 26 and the lower second member 28, is improved without increasing the number of components.

(2) The peripheries 50, 51 of the upper second member 27 and the lower second member 28 of the timing chain cover 11 have the second joint surfaces 52 joined to the first member 26. The lattice-shaped recess portions 53 are formed on the entire second joint surfaces 52.

According to this configuration, when the first member 26 is produced by insert molding with the upper second member 27 and the lower second member 28 embedded in the first member 26, the recess portions 53 formed in the second joint surfaces 52 of the upper second member 27 and the lower second member 28 are filled with molten plastic. In this case, the lattice-shaped recess portion 53 ensures a sufficient contact area between the second joint surface 52 and the first member 26 in an effective manner. This increases the joint strength between the first member 26 and the set of the upper second member 27 and the lower second member 28 in an effective manner.

Modifications

The above-described embodiment may be modified as follows. The above-described embodiment and the following modifications can be combined as long as the combined modifications remain technically consistent with each other.

The recess portions 53 do not necessarily need to be formed on the entire second joint surfaces 52. That is, the recess portions 53 may be formed in part of the second joint surfaces 52.

The second joint surface 52 may be formed in parts of the upper second member 27 and the lower second member 28 that are included neither in the peripheries 50, 51 nor in the peripheries 46, 47 of the first insertion holes 30, 37 and the second insertion holes 31, 42.

The material of the upper second member 27 and the material of the lower second member 28 may be the same.

The material of the upper second member 27 is not limited to polyphenylene sulfide (PPS), but may be a metal such as die cast aluminum, or a hard plastic such as liquid crystal polymer (LCP), polyether ether ketone (PEEK), polyethylene naphthalate (PEN), polyamide 6T (PA6T), polyamide 9T (PA9T), polybutylene terephthalate (PBT), or polyacetal (POM).

The material of the lower second member 28 is not limited to die cast aluminum, but may be a metal other than die cast aluminum, or a hard plastic such as polyphenylene sulfide (PPS), liquid crystal polymer (LCP), polyether ether ketone (PEEK), polyethylene naphthalate (PEN), polyamide 6T (PA6T), polyamide 9T (PA9T), polybutylene terephthalate (PBT), or polyacetal (POM).

The shape of the timing chain cover 11 may be changed.

The shapes of the upper second member 27 and the lower second member 28 may each be changed.

The number and positions of the extending portions 44 of the lower second member 28 may be changed.

The diameters of the first insertion holes 30, 37 and the second insertion holes 31, 42 may be changed.

The cover is not limited to the timing chain cover 11, but may be a timing belt cover configured to be attached to the main body of an engine that uses a timing belt instead of the timing chain 25.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cover for an internal combustion engine, the cover being configured to be attached to an engine main body so as to cover a timing chain or a timing belt that transmits a rotational force of a crankshaft to a camshaft, and the cover including insertion holes configured to receive the crankshaft or the camshaft, the cover comprising: a first member made of a hard plastic; and a second member made of a material different from the hard plastic, wherein
the first member is produced by insert molding with the second member embedded in the first member, a periphery of at least one of the insertion holes in the second member includes a joint surface that is joined to the first member such that the second member and the first member are contiguous, the joint surface includes a plurality of annular grooves surrounding the at least one of the insertion holes, the plurality of annular grooves being arranged in a radial direction of the at least one of the insertion holes, the first member includes a plurality of protrusions arranged in a radial direction of the at least one of the insertion holes, and the plurality of protrusions are configured to protrude into a recessed portion of each of the plurality of annular grooves.

2. The cover for the internal combustion engine according to claim 1, wherein the joint surface is a first joint surface, a periphery of the second member includes a second joint surface that is joined to the first member, and a lattice-shaped recess portion is formed at least in part of the second joint surface.

3. The cover for the internal combustion engine according to claim 2, wherein the recess portion is formed in the entire second joint surface.

4. The cover for the internal combustion engine according to claim 1, wherein the second member comprises an upper second member and a lower second member, and the upper second member is configured to receive the camshaft and the lower second member is configured to receive the crankshaft.

5. The cover for the internal combustion engine according to claim 4, wherein the upper second member and the lower second member are made of a same material.

6. The cover for the internal combustion engine according to claim 4, wherein a width of the upper second member is greater than a width of the lower second member.

7. The cover for the internal combustion engine according to claim 4, wherein the joint surface is a first joint surface, a periphery of the upper second member and a periphery of the lower second member each includes a second joint surface that is joined to the first member, and a lattice-shaped recess portion is formed at least in part of the second joint surface.

8. The cover for the internal combustion engine according to claim 7, wherein the lattice-shaped recess portion is formed in the entire second joint surface.

9. The cover for the internal combustion engine according to claim 1, wherein a width of the second member is less than a width of the first member.

* * * * *